(12) United States Patent
Liesén et al.

(10) Patent No.: US 7,658,819 B2
(45) Date of Patent: Feb. 9, 2010

(54) COMPOSITION

(75) Inventors: Jonas Liesén, Jörlanda (SE); Arne Andersson, Stenungsund (SE); Kerstin Malmborg-Nyström, Ödsmál (SE)

(73) Assignee: Akzo Nobel N.V., Arnhem (NL)

( * ) Notice: Subject to any disclaimer, the term of this patent is extended or adjusted under 35 U.S.C. 154(b) by 303 days.

(21) Appl. No.: 11/303,683

(22) Filed: Dec. 16, 2005

(65) Prior Publication Data
US 2006/0144542 A1 Jul. 6, 2006

Related U.S. Application Data

(60) Provisional application No. 60/640,406, filed on Dec. 30, 2004.

(51) Int. Cl.
D21F 11/00 (2006.01)
(52) U.S. Cl. .................. 162/158; 162/172; 162/181.1; 106/245; 524/140; 524/156
(58) Field of Classification Search ................ 106/245, 106/244, 270, 271; 162/158, 159, 172, 181.1, 162/181; 524/140, 141, 156, 157, 158, 161, 524/313, 394, 81
See application file for complete search history.

(56) References Cited

U.S. PATENT DOCUMENTS

| 2,630,410 | A | 3/1953 | Clapsadle et al. ........... 252/313 |
| 4,696,962 | A | 9/1987 | Danner et al. ............... 524/140 |
| 5,368,833 | A | 11/1994 | Johansson et al. ........... 423/338 |
| 5,389,204 | A | 2/1995 | Ampulski ................... 162/135 |
| 6,288,019 | B1 | 9/2001 | Mertens et al. ............. 510/417 |
| 6,815,403 | B1 | 11/2004 | Laney ........................ 510/191 |

FOREIGN PATENT DOCUMENTS

| GB | 2 115 829 A | 9/1983 |
| WO | WO 97/30217 A1 | 8/1997 |
| WO | WO 98/07927 A1 | 2/1998 |
| WO | WO 02/12626 A1 | 2/2002 |

OTHER PUBLICATIONS

European Search Report of Application No. EP 04 10 7059 dated Jun. 24, 2005.
Abstract of CN1308107 for EPO on-line data base esp@cenet.
Iler, Ralph K., "Sols of Silica Particles with Modified Surfaces," The Chemistry of Silica, John Wiley & Sons (1979) pp. 407-409.
"Pulp—Preparation of Laboratory Sheets for Physical Testing," Scandinavian Pulp, Paper and Board Testing Committee, SCAN-C 26:76, SCAN-M 5:76 (Dec. 1975) pp. 1-4.
"Fluff—Specific Volume and Absorption Properties," Scandinavian Pulp, Paper and Board Testing Committee, SCAN-C 33:80 (Jan. 1980) pp. 1-3.
"Fluff—Knot content," Scandinavian Pulp, Paper and Board Testing Committee, SCAN-CM 37:85 (Aug. 1985) pp. 1-3.
"Board—Determination of bursting strength," International Standard, ISO 2759 (Nov. 2001) pp. 1-11.

*Primary Examiner*—Mark Halpern
(74) *Attorney, Agent, or Firm*—Robert C. Morriss

(57) ABSTRACT

The invention relates to a composition used for enhancing softness in paper products. The composition comprises
(i) an oil, fat or wax
(i) at least one non-ionic surfactant
(iii) at least one anionic compound selected from anionic microparticles and anionic surfactants
(iv) at least one polymer which is cationic, non-ionic or amphoteric wherein the non-ionic surfactant is added in an amount of from about 60 to about 1000 parts by weight per 100 parts by weight of the polymer. The invention also relates to a process for production of paper comprising adding said composition to a cellulosic suspension or to a wet or dry paper web.

9 Claims, No Drawings

COMPOSITION

This application claims priority based on U.S. Provisional Patent Application No. 60/640,406, filed Dec. 30, 2004.

COMPOSITION

The invention relates to a composition used for enhancing softness in paper products. The invention also relates to a papermaking process in which the composition is added to the cellulosic suspension or applied to a wet or dry paper web. The composition comprises an oil, wax or fat; at least one cationic, amphoteric or non-ionic polymer; an anionic compound selected from anionic surfactants and anionic microparticles; and one or more non-ionic surfactant(s).

BACKGROUND

Paper webs or sheets, usually called tissue or paper tissue webs, are commonly used in paper towels, napkins, facial and toilet tissues. The important characteristics for such papers are softness, absorbency and strength. There is an ongoing work to improve each of these characteristics without seriously affecting the others.

Conventionally pressed tissue paper and methods for making such paper are well known in the art. Such paper is typically made by draining and forming a cellulosic suspension on a wire. The cellulosic suspension is usually contained in the headbox before being deposited on a Fourdrinier wire to form a paper web. The paper web is then typically dewatered by vacuum dewatering and further dried by pressing operations wherein the web is subjected to pressure developed by opposing mechanical members, for example cylindrical rolls or an extended nip press. The dewatered web is then further pressed and dried by a steam drum apparatus known in the art as a Yankee cylinder.

Conventional fluff and methods for making such paper are well known in the art. Such paper is typically made by making a paper sheet on a Fourdrinier wire and subsequently pressing and drying the paper sheet into bales or rolls. The dry paper is then defiberized using a hammermill or a pin defiberizer to form fluff. Typical products made from fluff are diapers and feminine hygiene products. Fluff can also be used to produce air laid paper products.

Softness is a tactile sensation perceived by the consumer holding a particular product, rubbing it across the skin or crumpling it within the hand. Softness of a sheet can be achieved by mechanical means. For example, the sheet can be calendered to flatten the crests formed when creping the sheet. The sheet can also be frictionally treated in order to eliminate any roughness. However, these approaches are often insufficient.

One way to make the paper softer is to add a softening compound to the cellulosic suspension. The softening compound interferes with the natural fibre-to-fibre bonding that occurs during sheet formation in papermaking processes. This reduction of bonding leads to a softer, or less harsh, sheet of paper.

WO 98/07927 describes the production of soft absorbent paper products using a softener. The softener comprises a quaternary ammonium surfactant, a non-ionic surfactant as well as strength additives. The softening agent is added to the cellulosic suspension before the paper web is formed.

A softening compound can also be applied to a dry or wet paper web e.g. by means of spraying. If the paper web is dry, the softening compound can also be printed on the paper.

U.S. Pat. No. 5,389,204 describes a process for making soft tissue paper with functional-polysiloxane softener. The softener comprises a functional-polysiloxane, an emulsifier surfactant and surfactants which are noncationic. The softener is transferred to the dry paper web through a heater transfer surface. The softener is then pressed on the dry paper web.

WO 97/30217 describes a composition used as a lotion to increase the softness of absorbent paper. The composition comprises an emollient which is preferably a fatty alcohol or a waxy ester. The composition also comprises a quaternary ammonium surfactant as well as one or more non-ionic or amphoteric emulsifiers.

Most softening compounds, either added to the cellulosic suspension or applied to the paper web, contain quaternary ammonium surfactants. Since producers and consumers experience a growing environmental concern, quaternary ammonium surfactants are not always accepted. The quaternary ammonium surfactants are generally toxic to aquatic organisms and are generally considered undesired chemicals.

It is an object of the invention to provide a composition for enhancing softness of a paper product.

It is a further object of the invention to provide a composition substantially free from quaternary ammonium surfactants.

Yet another object of the invention is to provide one single composition suitable for addition to the cellulosic suspension and applied to a wet or dry paper web, rather than several different compositions as described in the prior art.

Yet a further object of the invention is to provide a composition that has a high tolerance towards anionic carryover from preceding production stages. Standard formulations can thus be neutralised in the wet end when small amounts of detrimental substances are released from the preceding production stages.

It is also an object of the invention to provide a composition that, when added to the cellulosic suspension, will impart low burst strength, high wetting rate as well as low defiberization energy to the paper to be produced.

It is also a further object of the invention to provide a composition that, when added to the cellulosic suspension, will impart a low knot content to the product.

THE INVENTION

The invention relates to a composition used for enhancing softness in paper products, preferably products prepared from tissue or fluff. The composition can be applied at various stages in the papermaking process. The composition can for instance be added in the wet end to the cellulosic suspension. A composition added to the cellulosic suspension to enhance softness of the product is called a debonder. The composition can also be applied to the paper web to enhance the surface feel of the product, e.g. the softness. If the composition is applied to a wet paper web, the composition is called a softener. If the composition is applied to a dry paper web, the composition is called a lotion.

The composition of the invention comprises
 (i) an oil, fat or wax
 (ii) at least one non-ionic surfactant
 (iii) at least one anionic compound selected from anionic microparticles and anionic surfactants
 (iv) at least one polymer which is cationic, non-ionic or amphoteric, wherein the non-ionic surfactant is added in an amount of about 60 to about 1000 parts by weight per 100 parts by weight of the polymer.

According to one embodiment, the composition is substantially free from quaternary ammonium surfactants. By "substantially free" is meant that less than 5 wt % of the composition is comprised of quaternary ammonium surfactants, such as less than 1 wt %, or less than 0.5 wt %.

Any oil, fat or wax, functioning as an emollient, can be used according to the invention. Suitable oils are refined and/or hydrogenated grade oils, such as vegetable oils like grape oil, olive oil, coconut oil, rape seed oil, sunflower oil, and palm oil, most preferably coconut oil. Other oils that can be used according to the invention are mineral oils and silicon oil.

To retain the oil, fat or wax in a produced paper, a polymer functioning as a retention aid, is required. Suitable polymers for use as a retention agent or part of a retention system may be highly charged. According to one embodiment, the polymer is a cationic polymer. The polymers can be derived from natural or synthetic sources and they can be linear, branched or cross-linked, e.g. in the form of microparticles. Preferably, the polymer is water-soluble or water-dispersible.

Examples of suitable natural cationic polymers include cationic polysaccharides, e.g. starches, guar gums, cellulose derivatives, chitins, chitosans, glycans, galactans, glucans, xanthan gums, pectins, mannans, dextrins, preferably starches and guar gums. Suitable starches include potato, corn, wheat, tapioca, rice, waxy maize, barley, etc. Cationic synthetic organic polymers such as cationic chain-growth polymers may also be used, e.g. cationic vinyl addition polymers like acrylate-, acrylamide-, vinylamine-, vinylamide- and allylamine-based polymers, for example homo- and copolymers based on diallyldialkyl ammonium halide, e.g. diallyldimethyl ammonium chloride, as well as (meth)acrylamides and (meth)acrylates. Further polymers include cationic step-growth polymers, e.g. cationic polyamidoamines, polyethylene imines, polyamines, e.g. dimethylamine-epichlorhydrin copolymers; and polyurethanes. Further examples of suitable cationic organic polymers include those disclosed in WO 02/12626.

According to one embodiment, the polymer is selected from the group consisting of polydiallyldimethyl ammonium chloride, polyamines, cationic starch, amphoteric starch, and polyamidoamine-epichlorohydrin (PAAE), polyethylene imines and polyvinylamines.

The term "step-growth polymer", as used herein, refers to a polymer obtained by step-growth polymerization, also being referred to as step-reaction polymer and step-reaction polymerization respectively. The term "chain-growth polymer", as used herein, refers to a polymer obtained by chain-growth polymerization, also being referred to as The polymer according to the invention can have a molecular weight of from about 10000 to about 10000000, such as from about 15000 to about 5000000, or from about 40000 to about 1000000.

According to one embodiment, an anionic microparticle is comprised in the composition. Examples of suitable anionic microparticles include anionic silica microparticles, such as anionic colloidal silica particles, and smectite clays, most preferably anionic hydrophobically modified colloidal silica particles. The anionic microparticles preferably have a specific surface area from about 40 to about 900, such as from about 150 to about 600, or from about 250 to about 400 $m^2/g$.

Colloidal silica particles may be derived from e.g. precipitated silica, micro silica (silica fume), pyrogenic silica (fumed silica) or silica gels with sufficient purity, conventional sodium silicate, and mixtures thereof.

Colloidal silica particles according to the invention may be modified and can contain other elements such as amines, aluminium and/or boron, which can be present in the particles and/or the continuous phase. Boron-modified silica sols are described in e.g. U.S. Pat. No. 2,630,410. The aluminium modified silica particles suitably have an $Al_2O_3$ content of from about 0.05 to about 3 wt %, such as from about 0.1 to about 2 wt %. The procedure of preparing an aluminium modified silica sol is further described in e.g. "The Chemistry of Silica", by Iler, K. Ralph, pages 407-409, John Wiley & Sons (1979) and in U.S. Pat. No. 5,368,833.

The colloidal silica particles suitably have an average particle diameter ranging from about 2 to about 150, such as from about 3 to about 50, or from about 5 to about 40 nm. Suitably, the colloidal silica particles have a specific surface area from about 20 to about 1500, such as from about 50 to about 900, or from about 70 to about 600 $m^2/g$.

Anionic surfactants that can be used according to the invention are generally anionic surfactants with hydrophobic "tails" having from about 6 to about 30 carbon atoms. Examples of preferred anionic surfactants are saponified fatty acids, alkyl(aryl)sulphonates, sulphate esters, phosphate esters, alkyl(aryl)phosphates, alkyl(aryl)phosphonates, fatty acids, naphthalene sulphonate (NAS), formaldehyde polycondensates, polystyrene sulphonates, hydrophobe-modified NAS. Most preferred are saponified fatty acids, alkyl(aryl) sulphonates, sulphate esters, phosphate esters, alkyl(aryl) phosphates, alkyl(aryl) phosphonates, and mixtures thereof.

According to one embodiment, the anionic compound is an anionic surfactant.

Non-ionic surfactants that can be used according to the invention include generally ethoxylated or propoxylated fatty acids or fatty alcohols. The ethoxylated fatty acids and fatty alcohols have preferably been ethoxylated with from about 1 to about 30 ethylene oxide (EO), or from about 4 to about 25 EO. The ethoxylated fatty acids and fatty alcohols may have from about 6 to about 30 carbon atoms, or from about 6 to about 22 carbon atoms. The propoxylated fatty acids and fatty alcohols may have been propoxylated with from about 1 to about 30 propylene oxide (PO), or from about 1 to about 8 PO. The propoxylated fatty acids and fatty alcohols preferably have from about 6 to about 30 carbon atoms, such as from about 6 to about 22 carbon atoms. It is also possible to use carbon dioxide instead of propylene oxide.

The polymer is suitably present in the composition in an amount of from about 1 to about 50, such as from about 5 to about 40, or from about 10 to about 30 wt % based on the dry weight of the composition.

The oil, fat or wax is suitably present in the composition in an amount of from about 1 to about 95, such as from about 30 to about 80, or from about 35 to about 75 wt % based on the dry weight of the composition.

The anionic compound is suitably present in the composition in an amount of from about 0.1 to about 10, such as from about 0.5 to about 4, or from about 0.6 to about 2 wt % based on the dry weight of the composition.

According to one embodiment, the non-ionic surfactant is present in an amount of from about 70 to about 800, or from about 80 to about 600, or from about 100 to about 500, or from about 150 to about 400 parts by weight per 100 parts by weight of the polymer.

The composition can be prepared by first mixing the oil, fat or wax together with the anionic and non-ionic surfactants to provide an emollient-surfactant blend. The emollient-surfactant blend may be heated to about 25 to about 70° C. An aqueous solution containing the polymer is suitably prepared in which solution the polymer content constitutes from about 0.1 to about 50, e.g. from about 0.5 to about 25 wt %. The aqueous solution may be heated to from about 25 to about 70°

C. The emollient-surfactant blend may then be emulsified in the aqueous solution containing the polymer by a static mixer, an ultra-turrax high shear device or a homogenizer. The product emulsion can then be cooled to room temperature. The cooling can for example be performed by using a heat exchanger.

According to one embodiment, the emollient surfactant mix is emulsified into the aqueous solution containing the polymer by means of a static mixer.

The composition can be produced in advance and then be delivered as one product to the paper mill. The composition can also be prepared on site at the paper mill from the different components.

It is also possible to add additional components to the composition. To avoid deterioration of the composition a preserving agent may be added. Several cosmetic additives can also be included, for example antioxidants, e.g. tocopherol, and aloe vera.

The invention also relates to a process for production of paper comprising adding the composition as described herein to a cellulosic suspension wherein said process further comprises draining the cellulosic suspension on a wire to form a paper web.

According to one embodiment, the composition may be added in an amount of from about 0.1 to about 15 kg/ton dry cellulosic fibres.

When the debonder is used for manufacturing fluff, the composition is usually added to a cellulosic suspension in an amount of from about 0.1 to about 15, such as from about 0.3 to about 10 kg/ton dry cellulosic fibres.

When the debonder is used for manufacturing tissue, the composition is usually added to a cellulosic suspension in an amount of from about 0.1 to about 15, such as from about 0.5 to about 4 kg/ton dry cellulosic fibres.

When used as a debonder in this process, the composition, as already stated herein, is added to the cellulosic suspension before the paper web is formed. Use of debonders is very common when making fluff and tissue. The debonder will interfere with the natural fibre-to-fibre bonds so that the strength is reduced. By reducing the strength the softness of the fluff and the tissue products are increased. According to one embodiment, the components of the composition can be added separately to the cellulosic suspension. Preferably, an emulsion of the oil, fat or wax and the anionic and non-ionic surfactant can be added as a pre-blend and a polymer, e.g. in an aqueous solution, can be added as a separate component to the cellulosic suspension.

According to one embodiment, when the components are added separately, the amount of each component added to the cellulosic suspension corresponds to the amount of each component in the composition as described herein.

According to one embodiment, when manufacturing fluff, the polymer can be added to a cellulosic suspension in an amount from about 0.01 to about 6 kg/ton dry cellulosic fibres. According to one embodiment, when manufacturing fluff, the polymer can be added to a cellulosic suspension in an amount from about 0.025 to about 3.5 kg/ton dry cellulosic fibres. According to one embodiment, when manufacturing fluff, the polymer can be added to a cellulosic suspension in an amount from about 0.05 to about 2.5 kg/ton dry cellulosic fibres.

According to one embodiment, when manufacturing fluff, the oil, wax or fat can be added to a cellulosic suspension in an amount from about 0.001 to about 14 kg/ton dry cellulosic fibres. According to one embodiment, when manufacturing fluff, the oil, wax or fat can be added to a cellulosic suspension in an amount from about 0.03 to about 12 kg/ton dry cellulosic fibres. According to one embodiment, when manufacturing fluff, the oil, wax or fat can be added to a cellulosic suspension in an amount from about 0.035 to about 11 kg/ton dry cellulosic fibres.

According to one embodiment, when manufacturing fluff, the anionic compound can be added to a cellulosic suspension in an amount from about 0.001 to about 1.5 kg/ton dry cellulosic fibres. According to one embodiment, when manufacturing fluff, the anionic compound can be added to a cellulosic suspension in an amount from about 0.003 to about 0.6 kg/ton dry cellulosic fibres. According to one embodiment, when manufacturing fluff, the anionic compound can be added to a cellulosic suspension in an amount from about 0.004 to about 0.3 kg/ton dry cellulosic fibres.

According to one embodiment, when manufacturing fluff, the non-ionic surfactant is suitably added to the cellulosic suspension in an amount of from about 70 to about 800, such as from about 80 to about 600, or from about 100 to about 500, or from about 150 to about 400 parts by weight per 100 parts by weight of the polymer.

According to one embodiment, when manufacturing fluff the oil, wax or fat is added in an amount of about 0.001 to about 14 kg/ton dry cellulosic fibres, the anionic compound is added in an amount of about 0.001 to about 1.5 kg/ton dry cellulosic fibres and the polymer is added in an amount of about 0.01 to about 6 kg/ton dry cellulosic fibres.

According to one embodiment, when manufacturing tissue, the polymer can be added to a cellulosic suspension in an amount from about 0.01 to about 8 kg/ton dry cellulosic fibres. According to one embodiment, when manufacturing tissue, the polymer can be added to a cellulosic suspension in an amount from about 0.03 to about 6 kg/ton dry cellulosic fibres. According to one embodiment, when manufacturing tissue, the polymer can be added to a cellulosic suspension in an amount from about 0.035 to about 5.5 kg/ton dry cellulosic fibres.

According to one embodiment, when manufacturing tissue, the oil, wax or fat can be added to a cellulosic suspension in an amount from about 0.001 to about 10 kg/ton dry cellulosic fibres. According to one embodiment, when manufacturing tissue, the oil, wax or fat can be added to a cellulosic suspension in an amount from about 0.03 to about 8 kg/ton dry cellulosic fibres. According to one embodiment, when manufacturing tissue, the oil, wax or fat can be added to a cellulosic suspension in an amount from about 0.035 to about 7.5 kg/ton dry cellulosic fibres.

According to one embodiment, when manufacturing tissue, the anionic compound can be added to a cellulosic suspension in an amount from about 0.001 to about 1 kg/ton dry cellulosic fibres. According to one embodiment, when manufacturing tissue, the anionic compound can be added to a cellulosic suspension in an amount from about 0.003 to about 0.4 kg/ton dry cellulosic fibres. According to one embodiment, when manufacturing tissue, the anionic compound can be added to a cellulosic suspension in an amount from about 0.004 to about 0.2 kg/ton dry cellulosic fibres.

According to one embodiment, when manufacturing tissue, the non-ionic surfactant is suitably added to the cellulosic suspension in an amount of from about 70 to about 800, such as from about 80 to about 600, or from about 100 to about 500, or from about 150 to about 400 parts by weight per 100 parts by weight of the polymer.

To evaluate the performance of the debonder, burst strength, defiberization energy and wetting rate can be measured. Low burst strength and low defiberization energy shows that the fibre-to-fibre bonds are weak, which in turn facilitates the production of tissue with enhanced softness. The wetting rate indicates that the finished product will have good absorption properties.

Also, when fluff is used in air-laid applications, it is important to minimise the number of knots. The knots can be described as clusters of fibres. A high number of knots can lead to poor formation and runnability in the air-laid process.

When the composition is applied to either a wet or dry paper web, the surface feel can be improved. Surface feel can be described as those surface properties which are tactile sensations perceived by the consumer. Surface feel can be evaluated by people in panel tests. Examples of such properties are softness, slipperiness and smoothness. According to one embodiment, the composition is added to the sheet as one single addition. According to another embodiment, the polymer can be added to the cellulosic suspension prior to the formation of the web, whereas the oil, fat or wax; the anionic compound; and the non-ionic surfactant are added to the wet or dry paper web.

The invention also relates to a process for production of paper comprising applying the composition as described herein to a wet paper web. When the composition is used as a softener in the papermaking process, the composition is usually sprayed onto the wet paper web after the press section but before the Yankee cylinder. By using the composition as a softener, it is possible to obtain a paper with a high surface softness with minimal decrease in strength.

According to one embodiment, when the composition is used as a softener in the manufacturing of tissue paper, the composition is usually added in an amount of from about 0.1 to about 10, preferably from about 0.3 to about 4 kg/ton dry cellulosic fibres.

The invention also relates to a process for production of paper comprising applying the composition as described herein to a dry paper web.

When the composition is used as a lotion in the above process, it is usually either sprayed or printed on a dry paper web. This is usually done in the converting process in which the final tissue product is formed. The lotion is suitably present as drops on the paper web surface and is not bonded to the fibres in the same way as a softener. The lotion modifies the surface properties of the tissue, but the lotion is also added for cosmetic reasons since the lotion can be released from the paper and transported to the consumer.

According to one embodiment, the dry paper web has a dry content of at least about 50, such as at least about 65, or at least about 80 wt %.

According to one embodiment, when the composition is used as a lotion for manufacturing tissue, the composition is usually added in the amount of from about 0.1 to about 70, such as from about 5 to about 50 kg/ton dry cellulosic fibres.

The cellulosic fibres utilized by the present invention will normally include fibres derived from wood pulp, which includes chemical pulp such as Kraft, sulphite and sulphate pulps, as well as mechanical pulps such as ground wood, thermomechanical pulp and chemical modified thermomechanical pulp. Recycled fibres may also be used. The recycled fibres can contain all the above mentioned pulps in addition to fillers, printing inks etc. Chemical pulps, however, are preferred since they impart a superior tactile of softness to tissue sheets made from it. The utilization of recycled fibres for making tissue often includes a process step known as deinking to remove as much as possible of the printing ink from the fibre slurry and most of the filler material to get an acceptable brightness and paper machine runnability of the recycled fibre slurry. The deinking process often includes addition of anionic substances such as saponified fatty acids and water glass to the fibre slurry. These substances are sometimes carried over to the paper machine and since these substances are anionic they can inactivate cationic chemicals added to the stock. These substances are called anionic detrimental substances or "anionic trash".

According to one embodiment, further components may be added to the cellulosic suspension used to make tissue or fluff. Such additives can for example be wet strength agents, dry strength agents, and wetting agents as well as other components usually used in the production process. According to one embodiment, an additional polymer being either cationic, non-ionic or amphoteric, can be added to the cellulosic suspension. Suitably the polymer is either a natural polymer, for example starch, or a synthetic polymer.

According to one embodiment, an anionic polymer is added to the cellulosic suspension, such anionic polymers can include anionic step-growth polymers, chain-growth polymers, polysaccharides, naturally occurring aromatic polymers and modifications thereof.

The invention is further illustrated by the following examples but the invention is not intended to be limited thereby.

EXAMPLE 1

Compositions according to the invention were prepared by first mixing coconut oil with a parasubstituted alkyl benzylsulphonic acid (~C12) (anionic surfactant) and with an unsaturated fatty alcohol with 16 to 18 carbon atoms being ethoxylated with 5 EO (non-ionic surfactant). The contents of the components were 50 wt % oil, 25 wt % anionic surfactant and 25 wt % non-ionic surfactant. The oil-surfactant blend was then heated to 50° C. An aqueous polymer solution was prepared. The concentration of the polymer in the aqueous solution was between 1 to 4 wt %. The polymer concentration for each composition is specified below. The aqueous polymer solution was heated separately to 50° C. The oil-surfactant blend was then emulsified in the aqueous polymer solution in a high shear ultra-turrax. The composition was then cooled to room temperature in a water bath. The weight ratio of the oil-surfactant blend to the aqueous solution was 15:85.

The polymers and the concentrations thereof in the aqueous solutions used when preparing compositions C1-C6 are listed below:

C1: 1 wt % Poly-DADMAC (SNF No. FL45DL)

C2: 3.4 wt % Poly-DADMAC (SNF No. FL45DL)

C3: 4 wt % Poly-DADMAC (SNF No. FL45DL)

C4: 1 wt % Poly-DADMAC (SNF No. FL45C)

C5: 4 wt % Poly-DADMAC (SNF No. FL45C)

C6: 1 wt % Polyamine

For comparison, debonder compositions marketed under the name Berocell® were used. The content of the two debonder compositions Ref. 1 and Ref. 2 is shown below.

Ref. 1: Berocell-589, hydrogenated tallow benzyl dimethyl ammonium chloride; fatty alcohol, C16-18 unsaturated ethoxylated with 5 EO Ref. 2: Berocell-509, dihydrogenated tallow dimethyl ammonium chloride; fatty alcohol, C16-C20 unsaturated ethoxylated with 6 EO; fatty acid C12-C18, propoxylated with 6PO The dry paper sheets were prepared by mixing 15 grams of chemical pine sulphate pulp with either water or contaminated white water up to 750 ml. The composition was added to the pulp suspension followed by 10 minutes of agitation. Thereafter, a sheet was prepared in a standard PFI-sheet-former (A4 sheets). The sheets were then pressed, dried and conditioned according to the standardised method SCAN C26:76.

EXAMPLE 2

The compositions C2 and C5 according to example 1 were compared to Ref. 1 (Berocell-589) as described in example 1. The compositions were added to the cellulosic suspension in an amount of 3.0 kg/ton based on dry cellulosic fibres.

Dry paper sheets were then prepared as described in example 1. The paper sheets were cut into stripes and were then defiberized with the help of a pin-defiberizer. The pin-defiberizer is connected to an energy meter which makes it possible to measure the energy consumption per kg paper, the defiberization energy. The results are shown in table 1.

TABLE 1

| Composition | Defiberization Energy (kJ/kg) | |
| --- | --- | --- |
| | Tap water | White water |
| C3 | 56 | 74 |
| C5 | 50 | 69 |
| Ref. 1 | 61 | 88 |

A lower defiberization energy will impart a higher degree of softness to the product. In table 1, it is clearly shown that the compositions according to the invention, C3 and C5, impart lower defiberization energy, which indicates enhanced softness compared to the composition according to prior art, Ref. 1.

EXAMPLE 3

Compositions C1, C3, C4, C5 and C6 according to example 1 were compared to Ref. 1 of example 1. The compositions were added to the cellulosic suspension in an amount of 3.0 kg/ton based on dry cellulosic fibres.

Dry paper sheets were then prepared according to example 1. The wetting rate was measured on the dry paper sheets according to the standardized method SCAN-C33:80. The results can be seen in table 2.

TABLE 2

| Composition | Wetting rate (s/3 g pulp) |
| --- | --- |
| C1 | 3.8 |
| C3 | 4.1 |
| C4 | 4.0 |
| C5 | 4.3 |
| C6 | 3.9 |
| Ref. 1 | 5.6 |

A low wetting rate is advantageous for both tissue and fluff products. In table 2, it is clearly shown that the compositions according to the invention, C1, C3, C4, C5, and C6, impart a lower wetting rate to a produced paper compared to the composition according to prior art, Ref. 1.

EXAMPLE 4

The composition C2 according to example 1 was compared to Ref. 2 of example 1. The amount of the composition added to the cellulosic composition varied between 0.5 to 4.0 kg/ton based on dry cellulosic fibres.

Dry paper sheets were prepared from the cellulosic suspension as described in example 1. The burst strength was measured according to the standardized method ISO 2758-2001. The results can be seen in table 3.

TABLE 3

| Amount added | Burst Strength (kPa % vs. reference) | |
| --- | --- | --- |
| kg/ton paper | C2 | Ref. 2 |
| 0.5 | 77 | 91 |
| 1.0 | 65 | 75 |
| 1.5 | 55 | 63 |
| 2.0 | 45 | 58 |
| 2.5 | 40 | 50 |
| 3.0 | 37 | 49 |
| 3.5 | 32 | 45 |
| 4.0 | 30 | 43 |

A low burst strength will impart softness to the product. In table 3, it is clearly shown that the composition, C2, according to the invention, has a lower burst strength for various added amounts of the composition, compared to the composition according to prior art, Ref. 2.

EXAMPLE 5

The composition C2 according to example 1 was compared to Ref. 2 of example 1. The amount of composition added to the cellulosic suspension varied between 1 to 2 kg/ton based on dry cellulosic fibres.

The knot content was measured using the standardised method SCAN-CM 37. The results can be seen in table 4.

TABLE 4

| | Amount added kg/ton dry paper | Knots % |
| --- | --- | --- |
| C2 | 1 | 3.3 |
| C2 | 2 | 1.1 |
| Ref. 1 | 1 | 4.2 |
| Ref. 1 | 2 | 1.5 |

A high number of knots can lead to poor runnability and formation. Therefore a low knot content is advantageous. In table 4, it is clearly shown that the composition according to the invention, C2, has a lower number of knots compared to Ref. 1.

EXAMPLE 6

An oil-surfactant blend was prepared by first mixing coconut oil with an anionic surfactant, alkyl benzylsulfonic acid (~C12), and two non-ionic surfactants, (1) castor oil ethoxylated with 15 EO and (2) an unsaturated fatty alcohol C16-C18 ethoxylated with 5 EO. The oil-surfactant blend was then emulsified in water to form an oil emulsion. To 100 ml of water 0.3 g of the oil-surfactant blend was used. An aqueous polymer solution containing polyDADMAC was prepared with a polymer concentration of 0.08 wt %.

The dry paper sheets were prepared by mixing 15 grams of chemical pine sulphate pulp with water up to 750 ml. The oil emulsion was added to the pulp suspension. The suspension was then agitated for 8 minutes. Then the polymer solution was added whereupon the suspension was agitated for 2 minutes. After that, a sheet was prepared in a standard PFI-sheetformer (A4 sheets). The sheets were then pressed, dried and conditioned according to the standardised method SCAN C26:76. The amounts by weight of each component added in each trial are given in table 5.

TABLE 5

| Composition No. | Coconut oil | Non-ionic surfactant (1) | Non-ionic surfactant (2) | Anionic surfactant | Polymer |
|---|---|---|---|---|---|
| 1 | 9.2 | 0.40 | 0.30 | 0.1 | 2.67 |
| 2 | 8.7 | 0.65 | 0.55 | 0.1 | 2.67 |
| 3 | 8.1 | 0.95 | 0.85 | 0.1 | 2.67 |
| 4 | 7.6 | 1.2 | 1.1 | 0.1 | 2.67 |
| 5 | 5.0 | 2.45 | 2.45 | 0.1 | 2.27 |

The ratio of non-ionic surfactants to polymer has been calculated as parts by weight non-ionic surfactants per 100 parts by weight polymer. The defiberization energy was measured in accordance with example 2. The added amount of the composition was 1 kg/ton and 3 kg/ton dry cellulosic fibres. The results are given in table 6.

TABLE 6

| Composition No. | parts non-ionic surfactant/100 parts polymer | Defiberization Energy (kJoule/kg) | |
|---|---|---|---|
| | | 1 kg/ton | 3 kg/ton |
| 1 | 26 | 132 | 124 |
| 2 | 45 | 125 | 115 |
| 3 | 67.5 | 103 | 67 |
| 4 | 86 | 98 | 64 |
| 5 | 216 | 93 | 62 |

A lower defiberization energy will impart a higher degree of softness to the product. In table 6 it can clearly be seen that the defiberization energy decreases when the weight ratio of non-ionic surfactants to polymer increases.

EXAMPLE 7

Two oil emulsions, E1 and E2, were prepared by mixing coconut oil with two non-ionic surfactants, (1) castor oil ethoxylated with 15 EO and (2) an unsaturated fatty alcohol C16-C18 ethoxylated with 5 EO. In emulsion E1 the weight ratio between the coconut oil; non-ionic surfactant (1) and non-ionic surfactant (2) was 5:2.5:2.5, in emulsion E2 the corresponding ratio was 7:1.5:1.5. The oil emulsion was formed by emulsify 15 g of the oil-surfactant blend, by means of an ultra-turrax, into 85 g of a 0.353 wt % dispersion of a silica sol having a specific surface area of 525 m$^2$/g. An aqueous polymer solution containing polyDADMAC was also prepared with a concentration of 0.08 wt %.

The dry paper sheets were prepared by mixing 15 grams of chemical pine sulphate pulp with water up to 750 ml. The oil emulsion was added to the pulp suspension whereupon it was agitated for 8 minutes. Then the polymer solution was added whereupon the suspension was agitated for 2 minutes. Thereafter, a sheet was prepared in a standard PFI-sheetformer (A4 sheets). The sheets were then pressed, dried and conditioned according to the standardised method SCAN C26:76. In trial 3, a conventional debonder Berocell 589, referred to as Ref. 1 in Example 1, has been used for comparison. When making the sheet, the conventional debonder was added then the suspension was agitated for 10 minutes. The defiberization energy was measured in accordance with example 2. The results are given in table 7.

TABLE 7

| Trial | | Defiberization Energy (kJoule/kg) |
|---|---|---|
| 1 | E1 | 64 |
| 2 | E2 | 62 |
| 3 | Ref. 1 | 78 |

A lower defiberization energy will impart a higher degree of softness to the product. In table 7, it can clearly be seen that the compositions according to the invention, E1 and E2, gives a lower defiberization energy than the conventional debonder, Ref. 1.

EXAMPLE 8

The same oil-surfactant blend and polymer solution as no. 5 in table 5 was prepared in accordance with example 6. In trial 1 the oil-surfactant blend was emulsified into the polymer solution to form one single composition.

Paper sheets were prepared by mixing 15 grams of chemical pine sulphate pulp with water up to 750 ml. The pulp suspension was then agitated for 10 minutes. In trial 2, the polymer was added after 8 minutes of agitation. In trials 1 and 3, no additions were made to the pulp suspension. After that, a sheet was prepared in a standard PFI-sheetformer (A4 sheets). The sheets were then pressed at 4.85 Bar for 5 minutes resulting in a dry content of about 50 wt %.

In trial 1, the composition was sprayed onto the sheets, in the amount of 1 and 3 kg/ton dry cellulosic fibres. In trial 2, the oil emulsion containing the oil-surfactant blend was sprayed onto the sheet so that the total addition, together with the polymer in the pulp suspension, was 1 and 3 kg/ton dry cellulosic fibres.

In trial 3, a conventional debonder Berocell 589, referred to as Ref: 1 in Example 1, has been used for comparison. The conventional debonder has also been sprayed onto the sheet in the amount of 1 and 3 kg/ton dry cellulosic fibres.

The sheets were then pressed at 4.85 Bar for 2 minutes, followed by drying on a drum at 80° C., for 2 h. After drying the sheets were conditioned in 23° C. and 50% relative humidity for at least 24 h before testing.

The defiberization energy was then measured in accordance with example 2, the knot content was measured according to the standardized method SCAN-CM 37 and the wetting rate was measured according to the standardized method SCAN-C33:80. The results are given in table 8.

TABLE 8

| Trial No. | Defiberization Energy (kJoule/kg) | | Knots (%) | | Wetting Rate (s) | |
|---|---|---|---|---|---|---|
| | 1 kg/ton | 3 kg/ton | 1 kg/ton | 3 kg/ton | 1 kg/ton | 3 kg/ton |
| 1 | 97 | 78 | 3.66 | 2.00 | 4.2 | 4.4 |
| 2 | 93 | 83 | 3.66 | 1.67 | 4.4 | 4.7 |
| 3 | 122 | 84 | 4.00 | 2.67 | 5.0 | 5.2 |

The compositions used in trial 1 and trial 2 show a clear improvement in defiberization energy, knot content and wetting rate compared to trial 3 in which a conventional debonder was used.

EXAMPLE 9

An oil-surfactant blend was prepared by first mixing coconut oil with an anionic surfactant, alkyl benzylsulfonic acid (~C12), and two non-ionic surfactants, (1) castor oil ethoxylated with 15 EO and (2) an unsaturated fatty alcohol C16-C18 ethoxylated with 5 EO. The oil-surfactant blend was then emulsified into water to form an oil emulsion. To 100 ml of water 0.3 g of the oil-surfactant blend was used. An aqueous solution containing a cationic starch, Amylofax PW, was prepared with a concentration of 0.08 wt %.

The dry paper sheets were prepared by mixing 15 grams of chemical pine sulphate pulp with water up to 500 ml. The oil emulsion was added to the pulp suspension at time 0, followed by 10 minutes of agitation. The cationic starch was added after 8 minutes. After that, a sheet was prepared in a standard PFI-sheetformer (A4 sheets). The sheets were then pressed, dried and conditioned according to the standardised method SCAN C26:76. The cationic starch was added in an amount of 2.5 kg/ton dry cellulosic fibres. The addition of oil emulsion was varied between 0 and 3 kg/ton dry cellulosic fibres. The defiberization energy was measured in accordance with example 2. The results are given in table 9.

TABLE 9

|  | Defiberization energy (kJoule/kg) | | | |
|---|---|---|---|---|
|  | 0 kg/ton | 1 kg/ton | 2 kg/ton | 3 kg/ton |
| Amount of added oil emulsion | 168 | 145 | 118 | 90 |

A lower defiberization energy will impart a higher degree of softness to the product. In table 9 it can clearly be seen that the defiberization energy decreases with an increased amount of oil emulsion.

The invention claimed is:

1. A composition comprising
   (i) an oil, fat or wax
   (ii) at least one non-ionic surfactant
   (iii) at least one anionic compound selected from anionic microparticles and anionic surfactants
   (iv) at least one polymer which is cationic,
   wherein said at least one non-ionic surfactant is present in an amount of from about 100 to about 1000 parts by weight per 100 parts by weight of said at least one polymer.

2. A composition according to claim 1, wherein the composition is substantially free from quaternary ammonium surfactants.

3. A composition according to claim 1, wherein the cationic polymer is a chain-growth polymer.

4. A composition according to claim 1, wherein the cationic polymer is a step-growth polymer.

5. A composition according to claim 1, wherein the oil is a vegetable oil.

6. A composition according to claim 1, wherein the oil is a coconut oil.

7. A composition according to claim 1, wherein said at least one non-ionic surfactant is present in an amount of from about 100 to about 800 parts by weight per 100 parts by weight of said at least one polymer.

8. A composition according to claim 1, wherein said at least one non-ionic surfactant is an ethoxylated or propoxylated fatty acid or fatty alcohol.

9. A composition according to claim 1, wherein the anionic surfactant is selected from the group consisting of saponified fatty acids, alkyl(aryl)sulphonates, sulphate esters, phosphate esters, alkyl(aryl)phosphates, alkyl(aryl)phosphonates, and mixtures thereof.

* * * * *

UNITED STATES PATENT AND TRADEMARK OFFICE
CERTIFICATE OF CORRECTION

PATENT NO. : 7,658,819 B2 Page 1 of 1
APPLICATION NO. : 11/303683
DATED : February 9, 2010
INVENTOR(S) : Liesén et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 568 days.

Signed and Sealed this

Twenty-eighth Day of December, 2010

David J. Kappos
*Director of the United States Patent and Trademark Office*